(No Model.)

A. BARA & E. DESJARDINS-LIEUX.
LAMP SHADE.

No. 323,624. Patented Aug. 4, 1885.

ATTEST.
William A. Garner,
R. E. Grant

INVENTOR.
Auguste Bara
and Ernest Desjardins-Lieux
by L. Deane
Attorney

UNITED STATES PATENT OFFICE.

AUGUSTE BARA AND ERNESTE DESJARDINS-LIEUX, OF PARIS, FRANCE.

LAMP-SHADE.

SPECIFICATION forming part of Letters Patent No. 323,624, dated August 4, 1885.

Application filed December 26, 1884. (No model.) Patented in France July 16, 1883, No. 156,553; in Belgium February 18, 1884, No. 64,198, and in Germany February 19, 1884, No. 30,108.

*To all whom it may concern:*

Be it known that we, AUGUSTE BARA and ERNESTE DESJARDINS-LIEUX, citizens of the Republic of France, residing at Paris, in said Republic, have invented certain new and useful Improvements in Lamp-Shade Adjusters, of which the following is a specification, reference being had therein to the accompanying drawings.

Figure 1:
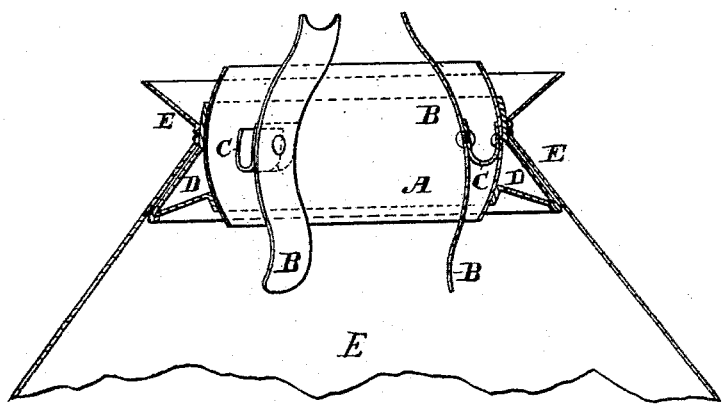
Figure 2:
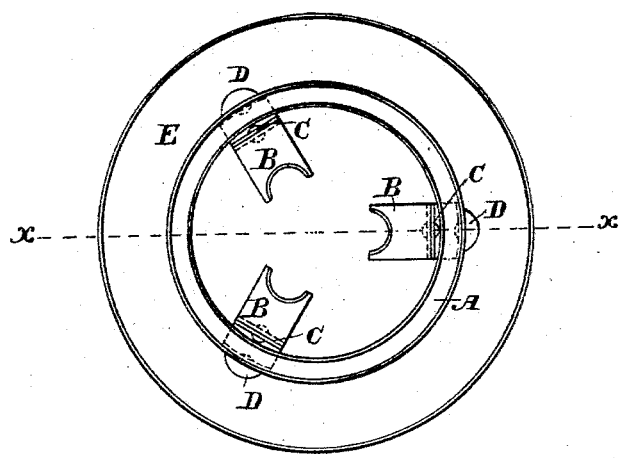

Figure 1 is a central cross-section on line $x$ $x$ of Fig. 2. Fig. 2 is a plan view of the device.

The object of our invention is to construct lamp-shades and reflectors so that they can be easily moved on their holders and thus caused to reflect the light in any direction. This is done by a system of superposed and concentric spherical surfaces and springs, all as will now be more fully described.

In the accompanying drawings, A is a spherical zone of any suitable material. The internal face of this zone is provided with clasps or claws B, which may be riveted to it or upon it, or otherwise held in place. In the annexed drawings they are shown fixed on springs C, which are attached on the inside of the zone A. It is this first piece, A, that is mounted on the chimney. Upon the external periphery of the zone A is placed another part, D, which is the shape of a conical frustum, and concentric to the part A, so that it may be revolved freely upon it. This part D may be composed of one or several pieces, as may be desired. The accompanying drawings show the part D as made of two pieces joined together at their edges. It is on the superior tapered part that the shade E or reflector is placed.

This shade is preferably made of two conical frusta united together at their smaller ends.

If desired, the shade can be permanently secured to the tapered part D.

The shade being mounted on the chimney by means of clasps B, the operation of the device can be easily understood. The spherico-tapered piece D, upon which the reflector or shade is fixed, being independent of and concentric to the part A, can be readily moved upon the chimney so as to throw the light in any desired direction.

It is obvious that, as the conical part D is movable on the periphery of the spherical zone A concentric with the axis of this zone, the shade E can be adjusted at any desired angle within the limit of the breadth of this zone; hence the light can be reflected at different angles.

Having now described our invention, we claim—

1. The combination of a spherical zone, A, clasping-springs secured inside thereof, and an adjustable holder for a lamp-shade, substantially as described.

2. The combination of the spherical zone A, springs B C, the tapered shade-support D, adjustable on said zone, as described.

In testimony whereof we affix our signatures in presence of two witnesses.

AUGUSTE BARA.
  ERNESTE DESJARDINS-LIEUX.

Witnesses:
 ROBT. M. HOOPER,
 GUSTAVE A. DITTMAR.